Nov. 17, 1942.  D. S. KUEHL ET AL  2,302,610
AUTOMATIC FEEDER FOR 2-ROLL MILL
Filed Dec. 27, 1939  2 Sheets-Sheet 1

Douglas S. Kuehl
Gordon R. McCormick
Rollo G. Russell
INVENTORS

BY Frank C. Hilberg
ATTORNEY

Nov. 17, 1942.   D. S. KUEHL ET AL   2,302,610
AUTOMATIC FEEDER FOR 2-ROLL MILL
Filed Dec. 27, 1939   2 Sheets-Sheet 2

Douglas S. Kuehl
Gordon R. McCormick
Rollo G. Russell
INVENTORS

BY Frank C. Hilberg
ATTORNEY

Patented Nov. 17, 1942

2,302,610

UNITED STATES PATENT OFFICE 2,302,610

AUTOMATIC FEEDER FOR TWO-ROLL MILL

Douglas S. Kuehl, Clio, and Gordon R. McCormick and Rollo G. Russell, Flint, Mich., assignors to E. I. du Pont de Nemours & Company, Wilmington, Del., a corporation of Delaware Application December 27, 1939, Serial No. 311,076

7 Claims. (Cl. 18—2)

This invention relates to roller mills. More particularly the invention relates to apparatus for automatically feeding material to roller mills and controlling roller mill scraper blades.

In removing highly viscous and plastic materials such, for example, as paint products, rubber, plastics, nitrocellulose products, and the like, from the rolls of 2-roll mills, various methods of controlling scraper blades have been employed. All of the prior scraper blade control methods of which we are aware have the disadvantage that, when it is necessary to pass the material through the rolls more than once, the materials scraped therefrom must be returned to the rolls manually.

The present invention has as an object a new and improved apparatus for automatically feeding material to roller mills used in the milling of materials requiring more than one passage through the rolls. A further object is the provision of means for automatically subjecting the materials to be treated to a predetermined number of passes through the rolls. Another object is the provision of a hopper for collecting materials after each passage through the rolls. A still further object is a new and improved mechanism for automatically controlling the pressure of the scraper blades on the roll. Another object is the removal of dangerous hazards incident to the manual operation of 2-roll mills. A still further object is the reduction in labor costs of handling the materials. Other objects will appear hereinafter.

These objects are accomplished in the present invention by an automatic electrically and mechanically operated scraper blade which, when positioned into contact with the roll on which the material is retained, removes same therefrom and causes it to be collected in a hopper, and when positioned out of contact with said roll, allows the materials collected in said hopper to be automatically returned to between the rolls for another passage therethrough.

For a more complete disclosure of the invention, reference may be had to the description thereof which follows and to the illustrations on the drawings in which—

Like numerals of reference refer to like parts in the several figures.

Figures 1, 2, 2A:
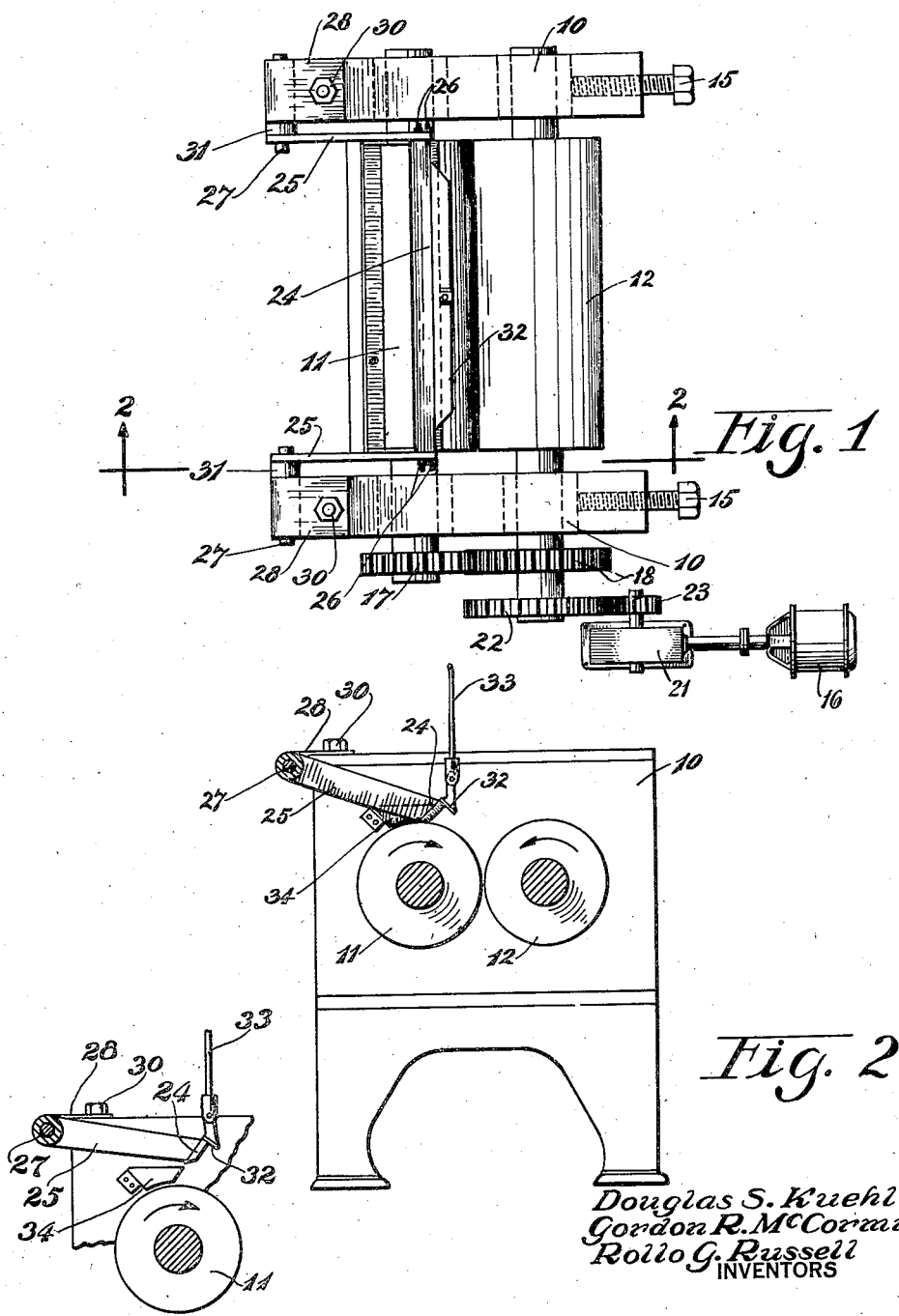
Figure 1 is a plan view of the grinding apparatus showing the scraper blade positioned in contact with the roll and the hopper.
Figure 2 is a cross-section on line 2—2 of Fig. 1.
Figure 2a is a cross-section showing the scraper blade out of contact with the roll and the hopper.

Referring more in detail to the drawings and especially to Figs. 1, 2, and 2a, one embodiment of a roller mill mechanism used in connection with this invention is shown. The mill comprises a suitable frame 10 in which is journaled a fast grinding roll 11 and a slow grinding roll 12, said rolls having their horizontal center lines in the same horizontal plane and made readily adjustable in the frame 10 so as to allow a desired amount of clearance between the rolls for grinding the materials therethrough. This adjustment is obtained in the present embodiment of the invention by means of adjustable screws 15, 15 the ends of which bear on the journals of the slow running roll and the threads of which fit into and co-operate with threads in the machine frame 10. The rolls 11 and 12 are made to rotate in opposite directions and at different speeds by means of any suitable motor 16, worm gear reducer 21, pinion gear 23, spur gear 22, and differential pinions 17 and 18.

An automatically adjustable scraper blade 24 is employed to remove the material from the roll on which it is retained. This adjustment is made in the present embodiment of the invention through the scraper blade arm support 25, one end of which is fastened to the end of the scraper blade by bolts 26, 26 and the other end of which is pivotally connected to stub shafts 27, 27 and made rotatable thereon. The stub shafts are rigidly fastened to plates 28, 28 by being welded thereto, and said plates, in turn, are attached to the machine 10 by bolts 30, 30. The scraper blade arm supports are positioned away from the machine frame on the stub shafts 27, 27 by spacing washers 31, 31. Attached to the back edge of the scraper blade is a supporting plate 32, and connected thereto substantially in the center thereof is a connecting rod 33, said rod being actuated by air pressure from an air cylinder 68 (Fig. 5) which automatically raises and lowers the scraper blade 24 whenever compressed air is admitted into or is released from the air cylinder.

The plastic material removed from the roll by the scraper blade is collected in a hopper 34 which is fastened to the machine frame 10 in such a manner as to allow enough clearance above the fast running rolls to permit passage thereunder of the adhering sheet of plastic. The scraper blade 24 forms one side of the hopper, and when in its cutting position on the roll, retains the scraped material therein, but when raised out of contact with the roll, allows the collected material in the hopper to be released therefrom, and the forward motion of the roll causes said material to be deposited between the rolls for another passage therethrough.

Figure 4:
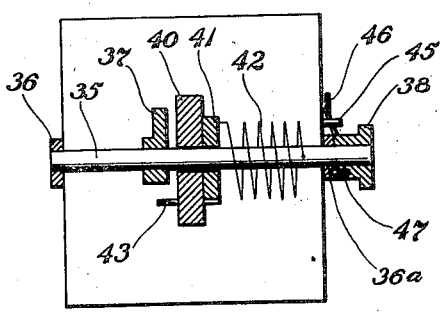
Figure 4 is a longitudinal section of the repeat mechanism.
Figure 3:
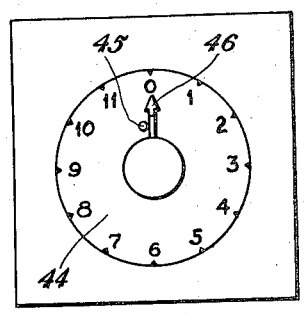
Figure 3 is a front elevation of the repeat mechanism.

The repeat mechanism shown in Figs. 3 and 4 provides a means for setting and automatically controlling the number of times the material is to be passed through the rolls. This mechanism comprises a rotatable shaft 35 supported in stationary shaft supports 36 and 36a. Attached to the shaft and made to rotate therewith are an arm 37 and a handle 38. A ratchet 40 with a cam plate 41 rigidly attached thereto are loosely mounted on the shaft 35 so that they may rotate thereon. Rotation of the ratchet 40 and cam plate 41 about the shaft 35 is provided through an advance solenoid pawl 61 (Fig. 5) whenever an advance solenoid 58 is energized. A tension spring 42 is placed about the shaft 35, one end of which is attached thereto and the other end of which is fastened to the cam plate 41. Attached to the ratchet 40 is a stop pin 43, said pin being so positioned thereon that it comes into contact with the arm 37 and prevents rotation of the ratchet and cam plate about the shaft 35 beyond the arm 37. Attached to the front of the repeat mechanism is a dial 44, said dial having numbers painted thereon and an indicator stop 45 fastened thereto. Attached to the handle 38 is an indicator 46. Shaft 35 is prevented from rotating in the stationary shaft supports by means of a ball catch 47.

Figure 5:
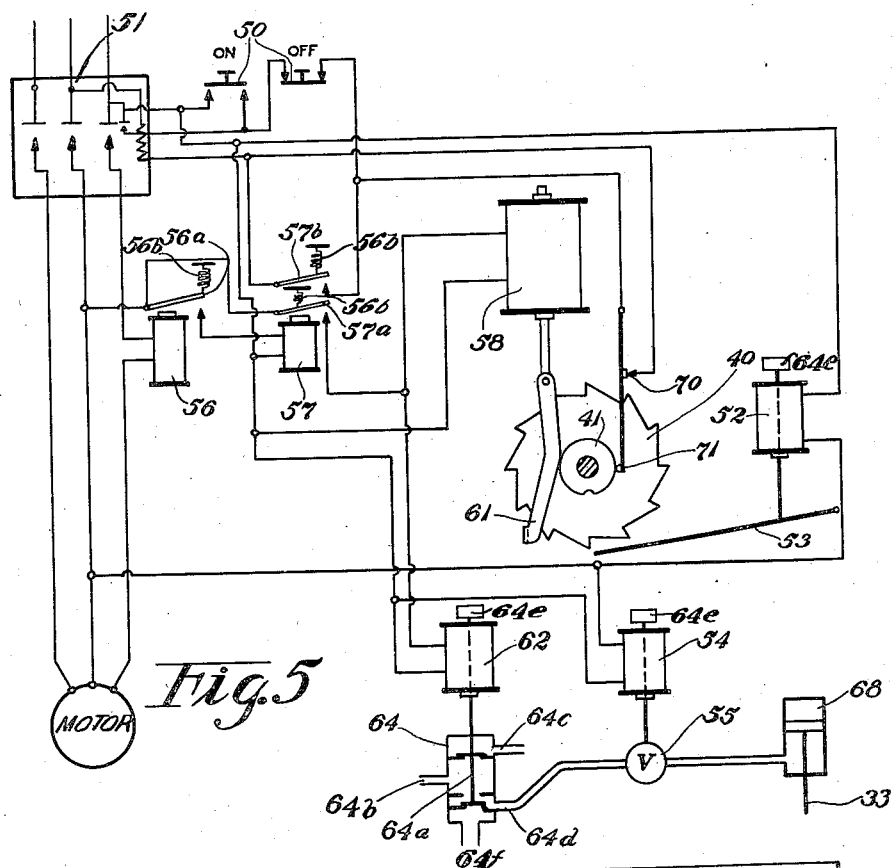
Figure 5 is a schematic diagram of the electrical and mechanical mechanism for automatically controlling the positioning of the scraper blade.

The electric mechanism for automatically moving the scraper blade into and out of contact with the fast running roll and for opening and closing the hopper is shown in this embodiment of the invention in Fig. 5, and comprises a push button switch 50, with on and off buttons, connected to a magnetic line starter 51 to which is supplied suitable electrical current. The push button switch 50 is also wired to close a hold solenoid 52 whenever the on button of the push button switch is closed. The stems of solenoids 52, 54, and 62 may be held down by any suitable means, such as a weight shown as 64e. The function of the hold solenoid is to bring the hold solenoid arm 53 into contact with the hold solenoid, and said arm when so positioned rests in a notch of the ratchet 40 and prevents it from rotating backwards against the tension of the spring 42 whenever the advance solenoid pawl 61 is out of contact with said ratchet. The push button switch is likewise wired to energize a solenoid 54 which opens and closes a solenoid valve 55. This valve when open allows the free passage of compressed air into the air cylinder 68, but when closed prevents air from entering said cylinder. The primary purpose of the solenoid valve is to hold the scraper blade into contact with the fast running roll at the end of the last pass, thus retaining the collected material in the hopper at the end of the milling operation.

The magnetic line starter 51 is connected to any suitable motor which drives the grinding rolls 11 and 12. A 1-pole load control relay 56 with contact 56a is wired to open and close whenever the power demand of the motor 16 is greater or less than some predetermined power demand setting of the 1-pole load control relay 56. A 2-pole relay 57 with contacts 57a and 57b is likewise wired to open and close whenever contacts 56a of the 1-pole relay 56 opens and closes. The 2-pole relay 57 energizes an advance solenoid 58 whenever contact 57a of the 2-pole relay 57 is closed. As the advance solenoid becomes energized, the advance solenoid pawl 61 is forced to assume its advanced position, and said positioning of the advanced solenoid pawl causes the ratchet 40 and the cam plate 41 to rotate about the shaft 35 a predetermined number of degrees, thus advancing the recess in the cam plate nearer to the cam index pin 71.

Closing contact 57a of the 2-pole relay 57 also energizes a solenoid 62 which actuates a piston 64a of a 3-way solenoid valve 64. The function of this valve is to regulate the air pressure in the air cylinder 68 which, in turn, controls the raising or lowering of the scraper blade from the fast running roll. The 3-way valve comprises a movable piston 64a, a compressed air inlet 64b, an air exhaust 64c that discharges to the atmosphere, and an air discharge 64d which is connected to the air cylinder 68 through the solenoid valve 55. When the 1-pole load control relay is energized, the compressed air entering the 3-way solenoid valve at the air inlet 64b is forced out the air exhust 64c since the piston 64a is raised up against the lower port. This allows the pressure in the air cylinder 68 to be released through exhaust 64b and causes the scraper blade to move into contact with the fast running roll for removing the material therefrom. When contact 56a of the load control relay is open, the solenoid 62 is de-energized and the piston 64a is lowered, thus closing the top port and opening the lower port. This permits compressed air to enter the air cylinder 68 and causes the scraper blade to move out of contact with the fast running roll. Furthermore, raising of the scraper blade opens the hopper 34 so that the material contained therein is permitted to be released therefrom and caused to be placed between the rolls for another passage therethrough.

A cam operated switch 70 is wired to keep the motor 16 running when the on button of the push button switch 50 is closed, and this switch remains closed as long as a cam index pin 71 rides on the cam plate 41. When the cam index pin, however, becomes engaged in the recess of the cam plate, and this occurs at the start of the final pass, the cam operated switch opens. In order to keep the motor 16 running during the last pass, contact 57b of the 2-pole relay 57 is made to parallel the cam operated switch, and, as long as this contact is closed, the motor continues to run. However, at the end of the last pass, when the power demand is below the preset power demand of the load control relay 56, contact 56a opens. This automatically stops the motor since both the cam operated switch 70 and contact 57b of the 2-pole relay are open.

Figure 6:
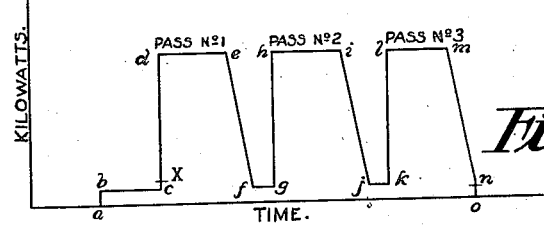
Figure 6 represents a theoretical power demand chart.

Figure 6 is a chart of the theoretical power demand for the automatic operation of a 2-roll mill when the material being milled therethrough is subjected to three repeat passes. This chart is a plot of power (kilowatts) against time. As soon as the on button of the push button switch and the cam operated switch are closed, the motor 16 starts rotating, and this in turn rotates the grinding rolls 11 and 12. The power demand necessary to rotate the rolls when no materials are being milled therebetween is represented graphically by the line bc, and this load will hereinafter be referred to as the idling load. As soon as the materials are placed between the rolls and the milling operation started, the power demand greatly increases, as is indicated by the line cd. The load control relay 56 is set at a power demand X, usually slightly greater than the idling load. When the power demand necessary to turn over the rolls is greater than the preset power demand value of the load control relay, contact 56a closes and the scraper blade moves into contact with the fast running roll. While the material between the rolls is being milled, as represented graphically by the line de, the power demand remains substantially constant. At the end of the pass, the power demand decreases to the idling load, as is shown by the line ef, and when it is below the preset power demand at which the overload relay is set, contact 56a opens, the scraper blade moves out of contact with the roll, and the material collected in the hopper is discharged therefrom by the forward rotation of the roll. This interval of time is represented graphically by the line fg. The procedure as hereinbefore described is repeated during the succeeding passes until the last pass is reached, when, instead of having the scraper blade move out of contact with the roll, the blade is made to remain in contact therewith, and the motor automatically stops.

In order that the operation of the apparatus hereinbefore described may be more readily understood, the following detailed explanation of the automatic electrically and mechanically controlled mechanism is given. The number of times the material is to be passed through the rolls is determined at the outset. The handle 38 of the repeat mechanism is rotated in a clockwise direction until the indicator 46 is opposite the number on the dial that corresponds to the number of repeat passes desired. Shaft 35 is then locked into position by means of the ball catch 47. Setting the indicator also causes the cam operated switch 70 to close, since the cam index pin is positioned away from the recess of the cam plate.

The on button of the switch 50 is next closed. This switch through the magnetic line starter 51 causes motor 16 to rotate, the rolls 11 and 12 turn in opposite directions and at different speeds. Closing the push button switch also energizes the hold solenoid 52 and opens the solenoid valve 55.

When the power demand required by the motor is greater than the setting of the power demand of the load control relay (usually slightly above the idling load as shown by Fig. 6), the relay 56 closes. This increase in power demand is brought about by the milling of materials through the rolls. When contact 56a closes, the 2-pole relay 57 is energized, thus closing contacts 57a and 57b. The closing of contact 57a in turn energizes the advance solenoid 58 and causes the advance solenoid pawl 61 to rotate the ratchet and cam plate about the shaft, thus bringing the recess in the cam plate one notch closer to the cam index pin 71. In addition to energizing the advance solenoid 58, contact 57a also energizes the solenoid 62 which, in turn, actuates the piston 64a of the 3-way solenoid valve 64. When this contact is closed, piston 64a is positioned so that compressed air is forced out the air exhaust 64c. Under these conditions, air is released from the air cylinder 68 and the scraper blade is moved into contact with the roll. Only one scraper blade is required in this tpe of mill, since the rolls are made to rotate at different speeds, thus causing all the material to be picked up onto the fast running roll.

As soon as the material between the rolls has been all worked through the rolls, the power demand on the motor decreases beyond that at which the load control relay 56 has been set. This causes contact 56a to open, the 2-pole relay 57 becomes de-energized, and contacts 57a and 57b open. These contacts may be biased open by a spring shown as 56b on no current conditions. The advance solenoid 58 likewise becomes de-energized, and this causes the advance solenoid pawl 61 to move from its advanced or raised position to its retarded or lowered position. The travel of the advance solenoid pawl from its raised to its lowered position is such that the lower catch of the advance solenoid pawl just clears the next lower notch of the ratchet 40. Since the cam operated switch 70 is closed, the motor 16 continues to run. The ratchet 40 and cam plate 41 are prevented from rotating about the shaft 35 in a counter-clockwise direction by means of the hold solenoid arm 53. Under these conditions, the solenoid 62 which actuates the piston of the 3-way solenoid valve is de-energized, the piston is lowered, and compressed air is forced into the air cylinder 68, thus holding the scraper blade out of contact with the roll. With the scraper blade raised out of contact with the roll, one side of the hopper 34 is caused to be opened and the material previously collected therein is released therefrom and caused to be deposited between the rolls for another pass therethrough. As the milling again starts, the power demand on the motor increases above the preset power demand load of the load control relay 56. contact 56a closes and the 2-pole relay 57 is energized, thus closing contacts 57a and 57b. Closing contact 57a energizes the advance solenoid 58 and causes the advance solenoid pawl 61 to assume its advanced position, thus causing it to rotate the ratchet 40 and cam plate 41 about the shaft 35, and bringing the cam another notch closer to the cam index pin 71. Closing contact 57a likewise energizes solenoid 62 which raises the piston 64a of the 3-way solenoid valve so that compressed air is released from the air cylinder 68, thus causing the scraper blade 24 to move into contact with the fast running roll and scrape the material therefrom. As soon as the material between the rolls is entirely milled, the demand power becomes less than that at which the load control relay is set, contact 56 closes, and the operations hereinbefore described are repeated.

At the start of the last pass, as predetermined and indicated by the setting on the dial 44, the repeat mechanism has allowed the cam operated switch 70 to open, and the cam index pin 71 has become engaged in the recess of the cam plate 41. At this stage of the pass, the power demand required by the motor is greater than the preset power demand of the load control relay 56, and contact 56a is closed, thus closing contacts 57a and 57b of the 2-pole relay 57. The motor, which is normally kept running by means of the closed cam operated switch 70, is now kept running by contact 57b, which parallels the cam operated switch. The scraper blade has moved into contact with the fast running roll and is ready to scrape the material therefrom. After all the material has been milled through the rolls and collected in the hopper for the last time, the power demand required by the motor falls below the power demand setting of the load control relay, and contact 56a of the load control relay 56 opens, the 2-pole relay 57 is de-energized, and contacts 57a and 57b open. Opening of contact 57b automatically shuts down the motor which, in turn, prevents any further rotation of the rolls 11 and 12. Shutting down the motor likewise de-energizes the hold solenoid 52 and the solenoid 54 and prevents air from entering the air cylinder 68, thus holding the scraper blade into contact with the fast running roll and retaining the material scraped therefrom in the hopper.

During the milling operation, the ratchet 40 and cam plate 41 were rotated in a clockwise direction about the shaft 35 against the tension of the spring 42, and said ratchet was held in position against this spring tension by means of the hold solenoid arm 53 and the advance relay pawl 61. At the end of the operation, however, when the advance solenoid pawl and the hold solenoid arm support are out of contact with the ratchet, the ratchet and cam plate are free to rotate about the shaft and relieve the additional tension placed in the spring during the milling operation. Such rotation continues until the stop pin 43 comes into contact with the arm 37. In order to again start the mill for the same number of passes, it is only necessary to press the on button of the push button switch 50, and this automatically repeats the hereinbefore described operation.

The invention hereinbefore described in detail possesses a number of important advantages in the operation of 2-roll mills over the prior art. Several of these advantages, by way of example only, will be enumerated. The manual labor formerly required in placing the material between the rolls, where more than one passage therethrough was desired, has been entirely eliminated. With this improved roller mill, the material is now automatically placed between the rolls for another pass therethrough by the moving of the scraper blade out of contact with the fast running roll, which causes one side of the hopper to open and allows the material so collected therein to be released therefrom. This not only results in a saving of labor, but it also promotes safety in operation by reducing the number of "man hours" the attendant is exposed to the running mill. As soon as the repeat mechanism is set and the starter button of the push button switch is closed, the operator is free to assume other duties as the mill will automatically stop at the end of the predetermined number of passes and retain the material in the hopper.

Furthermore, in addition to providing a saving in labor, the apparatus will operate more efficiently than a manually operated mill. Since the machine is regulated from the power demand of the motor, no time is lost in returning the batch collected in the hopper to between the rolls for another pass therethrough. To manually regulate this mechanism with the speed and accuracy obtained by this automatic control would require constant supervision.

A still further advantage of the invention over the prior art devices is that a more uniform product may result without constant supervision by the attendant. Once the repeat mechanism is set, each batch is subjected to the same number of passes. Other advantages are the elimination of hand adjustment of the scraper blade and the provision for self-alignment of the scraper blade on the roll.

As many apparently widely different embodiments of this invention may be made without departing from the operation and scope thereof; it is to be understood that the invention is not limited to the specific embodiment described herein except as defined in the appended claims.

We claim:

1. A roller mill for milling materials, comprising grinding rolls between which the material is to be milled and on one of which the said material is retained after being milled therethrough, means for rotating the roll on which the material is to be retained at a greater speed than the other grinding roll, a scraper blade positioned adjacent the upper part of the fast roll automatically movable into and out of contact with the fast grinding roll on which the material is retained to remove said material therefrom, a hopper positioned over said fast grinding roll, one side of which is formed by the scraper blade for collecting the material scraped from said roll, means for automatically moving the scraper blade into and out of contact with the said fast grinding roll, means responsive to power demand for turning the rolls operatively connected to the means for moving the scraper blade, the arrangement being so constructed that the scraper is moved to discharge material collected in the hopper when the rolls are running idle and the scraper is moved to roll scraping position when the power demand or torque reaches a maximum.

2. A roller mill for milling materials, comprising grinding rolls between which the material is to be milled and on one of which the said material is retained after being milled therethrough, means for rotating the roll on which the material is to be retained at a greater speed than the other grinding roll, a scraper blade positioned adjacent the upper part of the fast roll automatically movable into and out of contact with the fast grinding roll on which the material is retained to remove the material therefrom, a hopper positioned over said fast grinding roll, one side of which is formed by the scraper blade for collecting the material scraped from said fast grinding roll, means for automatically returning the material so collected to between the rolls a predetermined number of times, means for automatically moving the scraper blade into and out of contact with the said roll an equal number of times, means responsive to power demand for turning the rolls operatively connected to the means for moving the scraper blade, the arrangement being so constructed that the scraper is removed to discharge material collected in the hopper when the rolls are running idle and the scraper is moved to roll scraping position when the power demand or torque reaches a maximum.

3. A roller mill for milling materials, comprising fast and slow running rolls, a scraper blade positioned adjacent the upper part of the fast roll automatically movable into and out of contact with the fast running roll to remove the material therefrom, a hopper positioned over said fast grinding roll, one side of which is formed by the scraper blade for collecting the material scraped from said fast running roll, means for automatically returning the material so collected to between the rolls a predetermined number of times, means for automatically moving the scraper blade into and out of contact with the fast running roll an equal number of times, means responsive to power demand for turning the rolls operatively connnected to the means for moving the scraper blade, the arrangement being so constructed that the scraper is moved to discharge material collected in the hopper when the rolls are running idle and the scraper is moved to roll scraping position when the power demand or torque reaches a maximum.

4. A roller mill for milling materials, comprising grinding rolls between which the material is to be milled and on one of which it is retained after being milled therethrough, means for rotating the roll on which the material is to be retained at a greater speed than the other grinding roll, a scraper blade positioned adjacent the upper part of the fast roll automatically movable into and out of contact with the fast grinding roll on which the material is retained to remove same therefrom, a hopper positioned over said fast grinding roll for collecting the material scraped therefrom, means for automatically returning the material so collected in said hopper to between the rolls a predetermined number of times, means for automatically moving the scraper blade into and out of contact with said grinding roll an equal number of times, means responsive to power demand for turning the rolls operatively connected to the means for moving the scraper blade, the arrangement being so constructed that the scraper is moved to discharge material collected in the hopper when the rolls are running idle and the scraper is moved to roll scraping position when the power demand or torque reaches a maximum.

5. A roller mill for milling materials, comprising grinding rolls between which the material is to be milled and on one of which it is retained after being milled therethrough, means for rotating the roll on which the material is to be retained at a greater speed than the other grinding roll, a scraper blade positioned adjacent the upper part of the fast roll automatically movable into and out of contact with the fast grinding roll on which the material is retained to remove same therefrom, a hopper positioned over the said fast grinding roll for collecting the material scraped therefrom, means for automatically opening said hopper to allow the material to be fed to the grinding rolls, means for automatically moving the scraper blade into contact with the said fast grinding roll, means for causing these operations to occur a predetermined number of times, means responsive to power demand for turning the rolls operatively connected to the means for moving the scraper blade, the arrangement being so constructed that the scraper is moved to discharge material collected in the hopper when the rolls are running idle and the scraper is moved to roll scraping position when the power demand or torque reaches a maximum.

6. A roller mill for milling materials, comprising grinding rolls between which the material is to be milled and on one of which it is retained after being milled therethrough, means for rotating the roll on which the material is to be retained at a greater speed than the other grinding roll, a scraper blade positioned adjacent the upper part of the fast roll automatically movable into and out of contact with the fast grinding roll on which the material is retained to remove same therefrom, a hopper positioned over said fast grinding roll for collecting the material scraped therefrom, said hopper being automatically opened and closed by the raising or lowering of the scraper blade, means for automatically moving the scraper blade into and out of contact with the said fast grinding roll, means for causing this operation to occur a predetermined number of times, means responsive to power demand for turning the rolls operatively connected to the means for moving the scraper blade, the arrangement being so constructed that the scraper is moved to discharge material collected in the hopper when the rolls are running idle and the scraper is moved to roll scraping position when the power demand or torque reaches a maximum.

7. A roller mill for milling materials, comprising in combination grinding rolls between which the material is to be milled and on one of which it is retained after being milled therethrough, means for rotating the roll on which the material is to be retained at a greater speed than the other grinding roll, a scraper blade positioned adjacent the upper part of the fast roll automatically movable into and out of contact with the fast grinding roll on which the material is retained to remove same therefrom, a hopper positioned over said fast grinding roll to collect the material scraped therefrom, said scraper blade when in contact with the said fast grinding roll forming one side of the closed hopper and when out of contact therewith opening the hopper to allow the material collected therein to be released therefrom and caused to be placed between the rolls for another passage therethrough, a repeat mechanism for setting and automatically controlling the number of times the material is to be milled between the rolls, means for automatically moving the scraper blade into and out of contact with the said roll an equal number of times, means responsive to power demand for turning the rolls operatively connected to the means for moving the scraper blade, the arrangement being so constructed that the scraper is moved to discharge material collected in the hopper when the rolls are running idle and the scraper is moved to roll scraping position when the power demand or torque reaches a maximum.

DOUGLAS S. KUEHL.
GORDON R. McCORMICK.
ROLLO G. RUSSELL.